US008417021B2

(12) United States Patent
Cipolla et al.

(10) Patent No.: US 8,417,021 B2
(45) Date of Patent: Apr. 9, 2013

(54) IMAGE PROCESSING METHODS AND APPARATUS

(75) Inventors: Roberto Cipolla, Cambridge (GB); George Vogiatzis, Thessalonikis (GR); Paolo Favaro, Montebulluna (IT); Ryuji Funayama, Brussels (BE); Hiromichi Yanagihara, Brussels (BE)

(73) Assignee: Cambridge University Technical Services Limited, Cambridge (GB)

( * ) Notice: Subject to any disclaimer, the term of this patent is extended or adjusted under 35 U.S.C. 154(b) by 0 days.

(21) Appl. No.: 12/089,140

(22) PCT Filed: Oct. 12, 2006

(86) PCT No.: PCT/GB2006/050325
§ 371 (c)(1),
(2), (4) Date: Oct. 23, 2008

(87) PCT Pub. No.: WO2007/042844
PCT Pub. Date: Apr. 19, 2007

(65) Prior Publication Data
US 2009/0169096 A1 Jul. 2, 2009

(30) Foreign Application Priority Data

Oct. 13, 2005 (GB) .................................. 0520829.3

(51) Int. Cl.
*G06K 9/00* (2006.01)
(52) U.S. Cl. .... 382/154; 382/232; 382/235; 375/240.26
(58) Field of Classification Search .................. 382/232, 382/235, 154; 375/240.26, 240.03
See application file for complete search history.

(56) References Cited

U.S. PATENT DOCUMENTS 4,651,225 A * 3/1987 Yamada ........................ 358/451
5,237,397 A * 8/1993 Mighdoll et al. ........ 375/240.25
(Continued)

FOREIGN PATENT DOCUMENTS
DE 10256644 A1 6/2004
JP 06318299 11/1994
(Continued)

OTHER PUBLICATIONS

Tianli Yu et al: "Shape and View Independent Reflectance Map from Multiple Views" Proceedings of the European Conference on Computer Vision ECCV, May 11, 2004, pp. 602-615, XP019005952, Berlin Heidelberg; abstract, Sections "2 Problem Formulation", "3 View Independent Reflectance Map" "4.3 VIRM and Shape Optimization", "5.3 Van Gogh Data Set (Real)", "6 Conclusion and Future Works".

(Continued)

*Primary Examiner* — Vu Le
*Assistant Examiner* — Aklilu Woldemariam

(57) ABSTRACT

We describe methods of characterizing a set of images to determine their respective illumination, for example for recovering the 3D shape of an illuminated object. The method comprises: inputting a first set of images of the object captured from different positions; determining frontier point data from the images, this defining a plurality of frontier points on the object and for each said frontier point a direction of a normal to the surface of the object at the frontier point, and determining data defining the image capture positions; inputting a second set of images of said object, having substantially the same viewpoint and different illumination conditions; and characterizing the second set of images said frontier point data to determine data comprising object reflectance parameter data ($\beta$) and, for each image of said second set, illumination data (L) comprising data defining an illumination direction and illumination intensity for the image.

16 Claims, 12 Drawing Sheets

U.S. PATENT DOCUMENTS

| | | | |
|---|---|---|---|
| 5,576,849 A * | 11/1996 | Murakami et al. | 358/2.1 |
| 5,579,456 A * | 11/1996 | Cosman | 345/419 |
| 5,714,745 A * | 2/1998 | Ju et al. | 235/469 |
| 6,369,913 B2 * | 4/2002 | Aoyagi et al. | 358/1.9 |
| 6,428,028 B1 * | 8/2002 | Folino et al. | 280/249 |
| 6,750,873 B1 * | 6/2004 | Bernardini et al. | 345/582 |
| 6,873,341 B1 * | 3/2005 | Adams et al. | 345/629 |
| 6,975,755 B1 * | 12/2005 | Baumberg | 382/154 |
| 7,447,384 B2 * | 11/2008 | Kitora et al. | 382/305 |
| 7,574,067 B2 | 8/2009 | Tu et al. | |
| 2001/0012112 A1 * | 8/2001 | Aoyagi et al. | 358/1.9 |
| 2003/0071807 A1 | 4/2003 | Matsumoto et al. | |
| 2004/0120606 A1 * | 6/2004 | Fredlund | 382/305 |
| 2005/0105624 A1 * | 5/2005 | Kato et al. | 375/240.26 |
| 2005/0152450 A1 * | 7/2005 | Ueno et al. | 375/240.03 |
| 2005/0207655 A1 * | 9/2005 | Chopra et al. | 382/218 |
| 2006/0048697 A1 * | 3/2006 | Houge et al. | 117/11 |
| 2007/0219720 A1 * | 9/2007 | Trepagnier et al. | 701/300 |

FOREIGN PATENT DOCUMENTS

| | | |
|---|---|---|
| JP | 2000/102060 | 4/2000 |
| JP | 2003-109040 | 4/2003 |
| WO | WO 2005/038402 | 4/2005 |

OTHER PUBLICATIONS

Li Zhang et al.: "Shape and Motion Under Varying Illumination: Unifying Structure from Motion, Photometric Stereo, and Multi-View Stereo" Proceedings of the Eight IEEE International Conference on Computer Vision. (ICCV). Nice, France, Oct. 13-16, 2003, International Conference on Computer Vision, Los Alamitos, CA: IEEE Comp. Soc, US, vol. 2 of 2 Conf. 9, Oct. 13, 2003, pp. 618-625, XP010662419, ISBN: 0-7695-1950-4; abstract, sections "1. Introduction", "3. Multi-Frame Optical Flow Under Varying Illumination", "4. Uncertainties for Shape, Motion, and Light", "6. Results".

Matthies L et al: "Performance Evaluation of UGV Obstacle Detection with CCD/FLIR Stereo Vision and LADAR" Intelligent Control (ISIC), 1998. Held Jointly With IEEE International Symposium on Computational Intelligence in Robotics and Automation (CIRA), Intelligent Systems and Semiotics (ISAS), Proceedings of the 1998 IEEE International Symposium on Gaith, Sep. 14, 1998, pp. 658-670, XP010299053, ISBN: 0-7803-4423-5; abstract, section "2.0 Obstacle Detection Sensor Requirements".

Shinmoto: "*Reconstruction of 3D Orientation of Skin Surface Replicas by Expanding Photometric Stereo*"; The Transactions of the Institute of Electronics, Information and Communication Engineers D-11 (J77-D-11), No. 9, Japan, The Institute of Electronics, Information and Communication Engineers, Sep. 25, 1994, vol. J77-D-11, No. 9, pp. 1797-1805.

Japanese Office Action for related JP2008-535107, completed Sep. 30, 2011.

Japanese Office Action for related JP2008-535107, Mailed Apr. 13, 2012.

* cited by examiner

Determine a set of Frontier Points

Determine, for a data set a set of images (eg from a standard digital camera) , each with a lighting direction and intensity ("Intensity Images") and a set of frontier points with associated intensities, and for this object, a set of reflectance parameters, and in the set of images:
        1) Viewpoint of image capture camera same ( i.e. viewpoint constant)
        2) Lighting Varies (a)

(b)

(c)

(a)

(b)

(c)

IMAGE PROCESSING METHODS AND APPARATUS

CROSS-REFERENCE TO RELATED APPLICATIONS

This application claims the benefit of priority to World Intellectual Property Organization (WIPO) International Application No. PCT/GB2006/050325 filed on Oct. 12, 2006, and published as WO 2007/042844 on Apr. 19, 2007 entitled IMAGING PROCESSING METHODS AND APPARATUS, the entirety of which is incorporated by reference herein. This application also claims the benefit of priority to United Kingdom Patent Application No. GB0520829.3 filed on Oct. 13, 2005, entitled IMAGING PROCESSING METHODS AND APPARATUS, the entirety of which is incorporated by reference herein.

This invention is generally concerned with image processing methods, apparatus and computer program code, and more particularly with characterising a set of images in order to determine their respective illumination, for example for recovering a three-dimensional shape of an illuminated object.

The problem of reconstructing an object of arbitrary three-dimensional shape from a plurality of images is a difficult one, particularly when an object is non-Lambertian or "shiny". The task of determining object geometry when the illumination conditions and object reflectance are known is generally termed photometric stereo. A Lambertian object reflects equally in all directions; a non-Lambertian object does not meet this condition and this category includes shiny objects with significant highlights. We will describe techniques which work for both Lambertian and non-Lambertian objects.

One known technique for computing the geometry of a non-Lambertian object is described in Aaron Hertzmann, Steven M. Seitz., "Shape and Materials by Example: A Photometric Stereo Approach", *CVPR*, vol 01, p 533, 2003 2003. This technique uses an example object which is included in the imaged scene together with the object whose shape is to be determined. The example object has a known shape (for example a sphere) and the same surface reflectance; in the paper a sphere and a bottle are painted with the same material and lit in the same way. This allows the direction of a normal at a point on the surface of the bottle to be determined by matching the reflectance of the point with a corresponding point on the sphere. However the need to provide an example object with the same reflectance as the unknown object makes this method impractical in many situations.

Another technique, which does not require an example object, is described in "Recovering 3-D shape and reflectance from a small number of photographs", ACM International Conference Proceeding Series; Vol 44, Proceedings of the 14$^{th}$ Eurographics workshop on Rendering, Leuven, Belgium, Athinodoros S. Georghiades, p 230 to 240, 2003. However this technique relies on the existence of highlights on an object surface (i.e., the object has to be very shiny), these highlights providing information about the light direction. When applied to an object without such highlights the method suffers from bass-relief ambiguity, that is the reconstructed objects tend to appear flatter than they really are.

Further background prior art can be found in WO 02/41249; U.S. Pat. No. 6,590,669; EPO 358 628A; EPO 649 709A; U.S. Pat. No. 6,590,521; EPO 810 496A; Ravi Ramamoorthi, Pat Hanrahan, "A signal-processing framework for inverse rendering", SIGGRAPH '01, p 117-128, ACM Press, 2001; the website article—http://www.eng.cam.ac.uk/news/stories/2005/digital_pygmalion/, (1 Aug. 2005) describing Carlos Hernandez-Esteban's work on silhouette-based reconstruction, plus texture mapping; Wong & Cippolla—http://ieeexplore.ieee.org/ie15/83/28581/01278361.pdf which describes a complete and practical system for producing a 3D model from uncalibrated images of an arbitrary object using its profiles alone, and which mentions the use of Frontier Points; Sato, J. Cipolla, R. Uncalibrated reconstruction of curved surfaces, *Proceedings*, 8$^{th}$ *British Machine Vision Conference, Colchester* (September 1997); Edited by A. F. Clark, 2, 689-698 (BMVA, 1997); and Kutulakos' work on "Space Carving", for example K. Kutulakos, S. Seitz, "A Theory of Shape by Space Carving", *Int'l J Computer Vision*, vol 38, ni 3, 2000, p 199-218.

According to the present invention there is therefore provided a method of determining data characterising a set of images of an object, the method comprising: inputting data from a first set of images of said object captured from a plurality of different positions; determining frontier point data from said data for said first set of images and data defining said image capture positions, said frontier point data defining a plurality of frontier points on said object, and for each said frontier point, a direction of a normal to the surface of the object at the frontier point; inputting data from a second set of captured images of said object, said second set of images having substantially the same viewpoint and different illumination conditions; and determining data characterising said second set of images using said data for said second set of images and said frontier point data, said image set characterising data comprising object reflectance parameter data ($\beta$) and, for each image of said second set, illumination data (L) comprising data defining an illumination direction and illumination intensity for the image.

In preferred embodiments the image set characterising data is then used to determine geometry data defining a geometry of the object surface, although this data may, in other embodiments of the methods be employed for other purposes.

The object reflectance parameter data preferably comprises a plurality of parameters, for example between one and 10 parameters defining overall reflectance parameters for the object. The parameters of a standard model such as the Ward model (G. Ward, "Measuring and Modelling an Isotropic Reflection", in SIGGRAPH, pages 265-272, 1999) or the Torrance and Sparrow model (K. E. Torrance and E. M Sparrow, "Theory for Off-Specular Reflection from Roughened Surfaces", *J. Opt. Soc. Am*, 57; 1105-1114, 1967) may be employed. For example in one embodiment three parameters are employed, a shininess or surface roughness parameter ($\alpha$), a diffuse reflectance co-efficient ($\rho_d$), and a specular reflectance co-efficient ($\rho_s$), these three numbers applying to the whole object and characterising the object. The illumination data typically comprises three parameters, two defining a direction (for example altitude and azimuth), the third defining an illumination level for intensity. In embodiments of the method a source of illumination is assumed to be substantially at infinity. With this information a best-fit object shape can be determined from the image data for the second set of images, for example by determining a shape which minimizes a cost function dependent upon a difference between actual and predicted intensities at some known points on the object, in particular at the frontier points. The number of images in the second set depends partly upon the reflectance model employed—for example the Lambertian object in principle three images (corresponding to three directions) is sufficient to resolve the unknown parameters but in practice four are desirable for noise-reduction. For a non-Lambertian object more images are needed, for example around 10 images. Generally the number of images in the second set is between five and 50.

The number of frontier points determined is typically between 50 and 500, preferably around 80 to 100. Broadly speaking, a frontier point comprises a point in three-dimensions on the surface of the object where the plane defined by the point and the centres of two cameras viewing the point is tangent to the object. Details of frontier points, and of the related epipolar geometry can be found in R. Cipolla, P. J. Giblin, *Visual Motion of Curves and Surfaces*, Cambridge University Press, 1999; P. Giblin, F. Pollick, and J. Ryecroft, Recovery of an unknown axis of rotation from the profiles of a rotating surface, *J. Opt. Soc. Am*, 11A: 1976-1984, 1994; and D. Marr, Analysis of occluding contour. in *Proc. Royal Soc. London*, volume 197, page 441-475, 1977; all of which are hereby incorporated by reference in their entirety.

A preferred method of determining the frontier point data uses pairs of images, first and second images of each pair being captured by respective first and second cameras. To increase the numbers of pairs of images each image captured by the first camera may be paired with multiple images captured (in different positions) by the second camera, and so forth. These captured images are preferably then silhouetted in preparation to determining the frontier points. The determining of a frontier point preferably comprises moving an imaginary epipolar plane to touch the object, as determined by epipolar lines in respective first and second image planes of the first and second cameras both touching their respective silhouettes (in the camera image planes). Labelling the camera centres $C_1$ and $C_2$ an epipolar plane contains the line joining $C_1$ and $C_2$, this defining an epipolar line in the image plane of each camera. Moving the epipolar plane moves the epipolar lines in each image plane, and the plane is moved until these lines touch their respective silhouette in their two image planes, at which points the (imaginary) epipolar plane touches the object at a tangent, the normal to this plane then defining a normal to the object at the point where the plane touches the object. In this way a frontier point comprising a point in a three-dimensional space and a direction defining a normal to the object surface at the point may be determined.

The first set of images may be determined under almost any type of lighting conditions including, for example, flash photography. Given a set of camera positions in broadly the same position (albeit the exact position varying for each pair of images) a set of frontier points may be generally defined so as to be on one side of the object. A camera for capturing the second set of images can then be positioned looking generally towards this side of the object, and in this way each of the second set of images can include multiple frontier points (although in other embodiments of the method other techniques may be employed). Relatively low resolution cameras may be employed for determining the frontier point data but preferably a higher resolution camera is used for capturing the second set of images. The change in illumination amongst the second set of images may be achieved manually, for example simply by waving around a light source as the images are collected, or semi- or fully automatically.

Broadly speaking, the frontier points provide a sparse representation of the (convex part of) the shape of an object. This information may be employed to make tractable the problem of determining a best-fit object surface (in three dimensions) given a set of two-dimensional images obtained under varying illumination conditions. In practice, as discussed later, a normal or needle map ("hedgehog"-type representation) of the 3D object surface is first determined and then "integrated" (by any of a range of standard techniques) to recover the 3D surface.

In preferred embodiments of the method the determining of image set characterising data comprises determining projected positions of the frontier points (defined by the frontier point data) into each image of the second set of images (to identify the location of these points in each image of the second set), then determining image intensity data at each of these projected positions (the image intensity data may be defined, for example, by pixel level, amplitude or colour data), then determining the image set characterising data responsive to these projected positions and the image intensity data at the projected positions. More particularly this may be done by postulating image set characterising data comprising postulated object reflectance parameter data and postulated illuminated data (i.e., postulating an object reflectance and illumination), then determining predicted image data from the postulated data, at least at the frontier point positions, and then minimising any discrepancy between the predicted and actual (second set) image data. The discrepancy may be defined by a cost function comprising a summed discrepancy for at least the frontier points. In other words, broadly speaking, the illumination and object reflectance is postulated and adjusted to get the best-fit at the frontier points.

Having determined the object reflectance and illumination the frontier point information can be discarded as the determination of the object shape can now be performed in a substantially conventional manner by fitting the shape to the actual image given the object reflectance and illumination data. In practice, however, because the frontier points represent known points on the object surface (at least to some degree of accuracy) these may be used to initialise a search for a best-fit object surface in three dimensions.

The determining of the geometry data for the objects' surface is preferably performed by a photometric stereo geometry determining procedure. Each pixel of an image set may be treated substantially independently, and thus the determination of geometry data may be performed on a pixel-by-pixel basis (either in serial, or in parallel, or in some combination of the two). In other words since, say, the first pixel of each image of the second set of images corresponds to substantially the same spatial location (the second set of images being captured from substantially the same viewpoint) the geometry determining procedure may perform a best-fit of a surface normal of the object to a set of pixel values, one from each image of the second set, given the previously determined image set characterising data. Preferably the complete image area of the image of the second set is processed, but optionally only that part of the image predicted or determined to contain the object need be processed. Thus an intermediate output of the method may comprise a map comprising a surface normal direction for each pixel of an image of the second set, and therefore for each pixel of each image of the second set. The surface normal data may be employed to determinate 3D surface geometry explicitly by integration. For example see, R. Basri and D. Jacobs, "*Photometric Stereo with General, Unknown Lighting*," Proc. Computer Vision and Pattern Recognition Conf., pp. 374-381, 2001.

We have described how embodiments of the method may be employed to recover the shape of the object, but a variant of the method may be employed to reconstruct a light field or illumination map. In this variant the second set of images comprises images from different viewpoints, as well as having different illumination. In principle the same images may be employed for both the first and second set of images, that is the frontier points may be determined from the same set of images later used to determine the light field or illumination. Depending upon the complexity of the light field typically between 10 and 100 images are needed.

Thus in a related aspect the invention provides a method of determining data characterising a set of images of an object, the method comprising: inputting data from a first set of images of said object captured from a plurality of different positions; determining frontier point data from said data for said first set of images and data defining said image capture positions, said frontier point data defining a plurality of frontier points on said object, and for each said frontier point, a direction of a normal to the surface of the object at the frontier point; inputting data from a second set of captured images of said object, said second set of images having different viewpoints and illumination conditions; and determining data characterising said second set of images using said data for said second set of images and said frontier point data, said image set characterising data comprising object reflectance parameter data ($\beta$) and illumination data comprising data defining a common angular illumination intensity distribution for all the images of said second set of images.

Broadly speaking the illumination data determined by embodiments of the method has more parameters than that used for reconstructing a three-dimensional surface of an object, and defines an angular intensity distribution. However this angular intensity distribution is substantially the same for the complete (second) set of images and, again, this distribution may be determined by minimising a cost function dependent upon a summed discrepancy between predicted and actual intensity data at frontier points on an object or objects in the images. The illumination map may be relatively coarse, for example merely specifying two, three or a few light sources (intensity and direction), or a more complex angular intensity distribution may be determined, in which case more images are needed for noise-reduction. This technique may be used, for example, to determine an illumination map defining an angular intensity distribution of illumination in a set of images from a film sequence.

The invention further provides processor control code to implement the above-described systems and methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate, such code and/or data may be distributed between a plurality of coupled components in communication with one another.

In further aspects the invention provides apparatus including means to implement the above described methods, for example, including a carrier carrying processor control code as described above.

Thus in a further aspect the invention provides a system for determining data characterising a set of images of an object, the system comprising: an input to input data from a first set of images of said object captured from a plurality of different positions, and data from second set of captured images of said object, said second set of images having substantially the same viewpoint and different illumination conditions; data memory for storing data to be processed; program memory storing processor control code; and a processor coupled to said input, data memory and program memory to load and implement said stored code, said code comprising code for controlling the processor to: determine frontier point data from said data for said first set of images and data defining said image capture positions, said frontier point data defining a plurality of frontier points on said object and for each said frontier point, a direction of a normal to the surface of the object at the frontier point; and determine data characterising said second set of images using said data for said second set of images and said frontier point data, said image set characterising data comprising object reflectance parameter data ($\beta$) and, for each image of said second set, illumination data (L) comprising data defining an illumination direction and illumination intensity for the image.

In preferred embodiments the method includes code for determining geometry data defining a three-dimensional surface of the object. Preferably the apparatus includes at least one camera controller for controlling the position of at least one, and preferably two cameras to capture images for the first set of images, and an image capture system for capturing images for both the first and second set of images. The code may then include code to control the camera controller and to capture images for the first and second set of images. The system may include a push-button to control the image capture. The lighting variation may be performed manually and/or automatically, for example by means of a lighting controller to control one or more sources of illumination. The cameras and/or lighting may be provided on a framework but preferably, for flexibility of use, a pair of image capture cameras are provided on respective stands (tripods), each with a respective position (height) adjustment system for control by the camera controller to capture the above-mentioned images. A camera for capturing the second set of images may be provided at a fixed position again, for example, mounted on a stand or tripod.

The invention further provides a vehicle, including a mobility function to enable the vehicle to move itself, the vehicle further including: a system to determine relative position of the vehicle from a point; at least one camera to capture images; a system to utilise said relative vehicle position to reconstruct shapes of one or more objects from images captured from said camera by moving the vehicle, and to thereby detect an area unoccupied by said one or more objects. Preferably the vehicle further comprises a system for determining a direction of sunlight, and wherein said shape reconstruction system is configured to one said sunlight direction in said object shape reconstruction. In this way, the vehicle can, by itself, detect a parking space in the vicinity of the vehicle, for parking the vehicle. This may be displayed to the driver and/or used for automatic parking. Thus an automatic parking system is also provided by aspects of the invention.

These and other aspects of the invention will now be further described, by way of example only, with reference to the accompanying figures in which.

Figure 1:
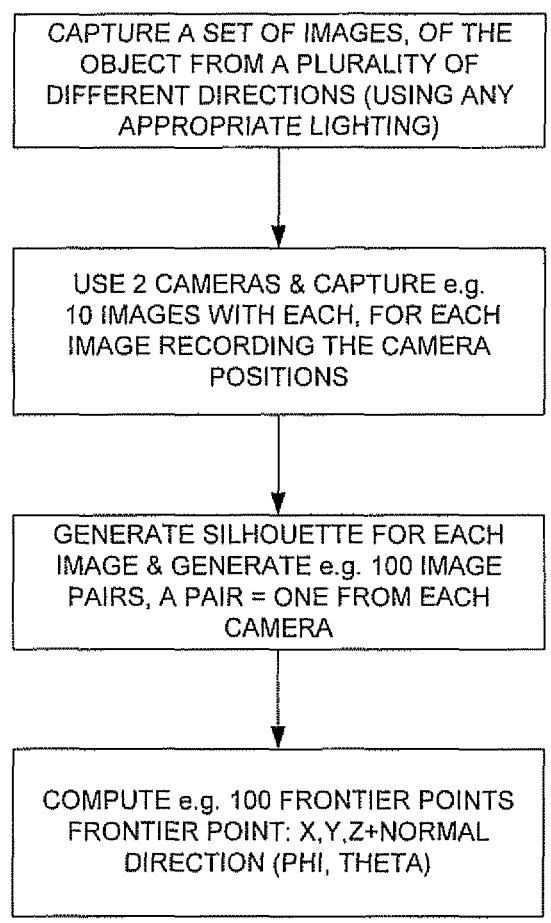
FIG. 1 shows a flow diagram of a procedure for capturing images and determining a set of frontier points.

We will first describe a detailed embodiment of the procedure and then provide examples of potential implementations of a system. The system we describe is concerned with the problem of recovering the problem of recovering reflectance and 3-d shape of a non-Lambertian object from a collection of images. The main challenge is how to establish correspondence between image regions that are projections of the same 3-d point in space. While for Lambertian objects one can solve correspondence by direct matching of image regions, in the non-Lambertian case such matching is not possible as the measured intensity may vary dramatically between images, due, for example, to the unknown specular component of the reflectance. Hence, in general, correspondence for non-Lambertian surfaces is established while recovering the reflectance and the surface of an object, together with the illumination distribution, which is a highly ill-posed and computationally challenging problem.

In our solution, rather than venturing into such a cumbersome optimization problem, we propose to establish correspondence by exploiting occlusions, and, more precisely, frontier points (Given two images each obtained from a different camera view, a frontier point is the 3-d location where the epipolar plane (defined by the two cameras) is tangential to the surface of the object. In addition, the normal to the surface at a frontier point coincides with the normal to the epipolar plane). We notice that occlusions are more resilient than other visual cues to changes in illumination or reflectance properties, which makes them suitable for non-Lambertian objects. Rather than matching image intensities, one can automatically determine correspondence by extracting the occluding boundary from each image region and then by searching along the boundary for the 2D points with tangents lying on the epipolar plane. This procedure allows not only to recover the 3-d location of a point on the surface (the frontier point), but also its corresponding normal vector. Hence, by working at frontier points one can solve a much easier problem where shape is locally given, and one is only left with recovering reflectance and illumination, which we pose as a blind deconvolution problem. Furthermore, if an object is made of the same material, the reflectance and illumination distribution recovered at frontier points can then be used to infer its full 3-d shape. We apply this scheme to the case of uniform albedo where very little work has been done in the general scenario where we operate.

The reflectance of a large class of objects is well approximated by the so-called bidirectional reflectance distribution function (BRDF). This is defined at each point P of a surface as a function $\beta(\theta_i, \phi_i, \theta_o, \phi_o)$ mapping the Cartesian product between the hemisphere of incoming light directions $(\theta_i, \phi_i)$ and the hemisphere of outgoing light directions $(\theta_o, \phi_o)$ to nonnegative values (we define the BRDF in local coordinates, i.e. we define a reference system at each point P on the surface of the object and set the z-axis parallel to the normal to the surface, while the x and y-axis lie on the tangent plane) a. The BRDF predicts how much light will be reflected at a point on a surface along a certain direction, due to incoming light. In the simplest instance of a Lambertian object, the BRDF is a constant, i.e. light is reflected equally in all directions. In the case of non-Lambertian objects the BRDF is much more involved and a number of models have been proposed, each described by a number of parameters. A typical example is the Ward model $$\beta(\theta_i, \phi_i; \theta_o, \phi_o) = \frac{\rho_d}{\pi} + \frac{\rho_s e^{-\tan^2\delta/\alpha^2}}{4\pi\alpha\sqrt{\cos\theta_i\cos\theta_o}} \quad (1)$$

where, if h is the bisector of the vectors $(\theta_i, \phi_i)$ and $(\theta_o, \phi_o)$; $\delta$ is the angle between h and N, where N is the normal to the surface at P. This model has three free parameters, $\rho_d$, $\rho_s$, and $\alpha$. Then, the irradiance observed at a pixel p, the projection of P on the image plane, is given by:

$$I(p) \doteq I(\theta_o, \phi_o) = \quad (2)$$
$$\int_0^{2\pi}\int_0^{\pi/2} \beta(\theta_i, \phi_i; \theta_o, \phi_o) L(R_P(\theta_i, \phi_i))\cos\theta_i\sin\theta_i\,d\theta_i\,d\phi_i$$

where the pixel p defines the local direction $(\theta_o, \phi_o)$. L is the light distribution and since it is defined in global coordinates, we need to introduce the rotation $R_P$ that transforms local coordinates at P to global coordinates.

Notice that the irradiance, given above, depends on the shape of the object via the normal field N, on the BRDF at each point P and on the global illumination L, which are, in general, all unknown. For simplicity, here we focus on objects made of the same material, i.e. we assume that the BRDF is the same at each point on the surface. In the next section, we will pose the problem of recovering these unknowns by matching the model of the irradiance equation to measured images.

Suppose we are given a number of images $I_{1,1}, \ldots, I_{K,M}$ obtained from K different vantage points and M different illumination conditions, then, as mentioned in the previous section, one may be interested in recovering the shape S of the object in the scene, which we identify with its normal field N and a 3-d point, its BRDF and the light distribution L. This problem can be posed as the following minimization:

$$\hat{S}, \hat{\beta}, \hat{L}_1, \ldots, \quad (3)$$
$$\hat{L}_M = \arg\min_{S,\beta,L_1,\ldots,L_M} \sum_{k=1}^K \sum_{m=1}^M \Phi(I_{k,m}, I_k(S, \beta, L_m))$$

where $I_k(S, L_m)$ is a short-hand notation for model (2), and its dependency on the unknowns has been made explicit. $\Phi$ is a function that accounts for the discrepancy between $I_{k,m}$ and $I(S, L_m)$. We require $\Phi$ to be zero if and only if $I_{k,m}=I_k(S, L_m)$, and to be strictly positive otherwise.

Notice that, given one of the unknowns, for instance, the shape S of the object, the minimization task (3) is dramatically simplified. Consider the case of M=1, i.e. fixed illumination conditions, then, one can easily show that the minimization (3) can be cast as a classic blind deconvolution problem where $\beta$ is the convolving kernel and L is the input signal. Similarly, if $\beta$ and L were given, then recovery of the shape S would be greatly simplified.

Our method exploits frontier points to this purpose. We will show that they provide some partial shape information that can be used to solve for β and L, which, in turn, can then be used to infer the complete shape S. Before presenting our solution we need to briefly introduce frontier points and how they are automatically extracted from images.

Figure 9:
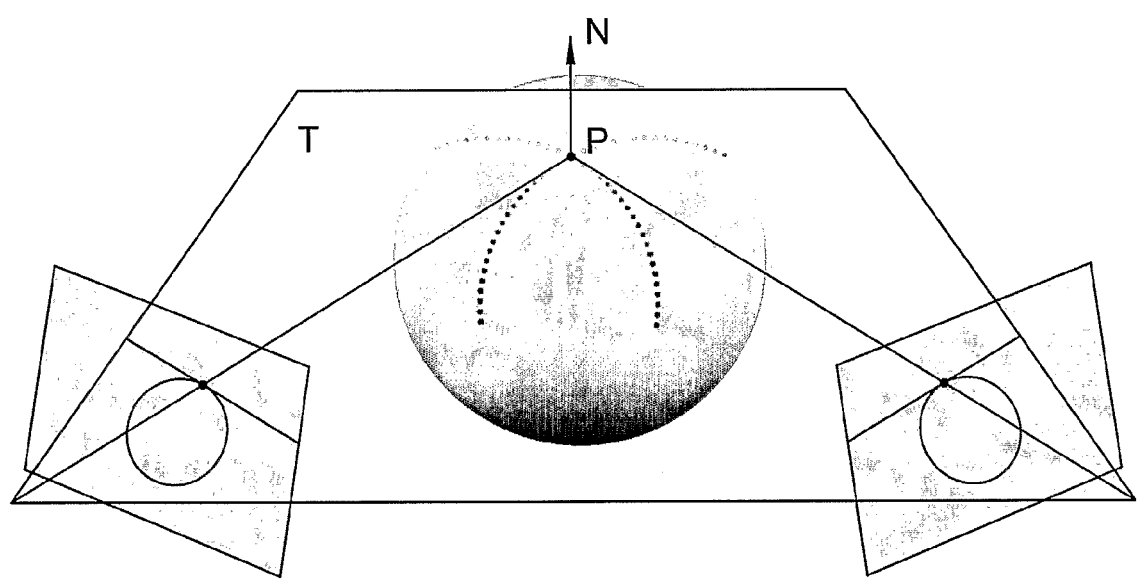
FIG. 9 shows frontier point geometry.

Suppose we are given two images of the same object from two different vantage points. A frontier point is defined as (one of) the point(s) given by the intersection of the object and the epipolar plane T tangent to the object (see FIG. 9). Notice that in this way we simultaneously define a point P on the surface and the normal N to the surface at that point.

An alternative and practical way to obtain frontier points is to look at the object's outlines. An outline is defined as the projection on the image plane of a 3-d curve lying on the object, such that any line connecting this 3-d curve with the camera centre is tangent to the object. Given two outlines, a frontier point P can be defined as the location in space that simultaneously satisfies the following properties:

The projection p of P on each camera lies on both the outlines

The tangent vector of each outline at the projection of the frontier point must lie on the same epipolar plane.

In our algorithm, we find frontier points by defining a cost functional that is minimized only when the two properties above are satisfied. The overall scheme for the automatic extraction of frontier points on the surface of an object is as follows: (a) Obtain a number of images of the object (calibrated for pose and internal parameters) (b) Extract the object's outlines in those images (c) Compute a number of frontier points lying on the extracted outlines and satisfying the properties above.

As mentioned above, frontier points not only define a point P on the object, but also a vector N normal to the object at P. Now, suppose that one is given a set of such pairs (P,N) that have been recovered by following the procedure described above. If we collect intensities at the selected frontier points into a single vector I, then we can solve problem (3) in the unknown light distribution L and BRDF β, since shape is given. We will consider this problem in two separate settings, namely when M=1 and K>1, i.e. in the case of fixed illumination and varying vantage point, and when M>1 and K=1, i.e. in the case of varying illumination and fixed vantage point.

Case I: Fixed Illumination (M=1 and K>1)

Here we choose the extended Kullback-Leibler pseudo-distance as our discrepancy measure, i.e. we set $$\Phi(I_k, J_k) \doteq I_k \log \frac{I_k}{J_k} - I_k + J_k \quad (4)$$

so that the optimization problem (3) becomes $$\hat{\beta}, \hat{L} = \arg\min_{\beta, L} \sum_{k=1}^{K} \Phi(I_k, J_k) \quad (5)$$

$J_k$ is directly derived from eq. (2) as $$\hat{\beta}, \hat{L} = \arg\min_{\beta, L} \sum_{k=1}^{K} \Phi(I_k, J_k) \quad (6)$$

To adapt our problem to blind deconvolution, we do a change of coordinates on $(\theta_i, \phi_i)$ so that $(\theta_i', \phi_i')=R_{Pk}(\theta_i, \phi_i)$, and then set $h(\theta_i', \phi_i'; \theta_k, \phi_k)=\beta(\theta_i', \phi_i'; \theta_k, \phi_k)\cos\theta_i' \sin\theta_i' \Delta_k$, where $\Delta_k$ is the Jacobian of the change of coordinates. As a result, we obtain $$J_k = \iint h(\theta_i', \phi_i'; \theta_k, \phi_k) L(\theta_i', \phi_i') d\theta_i' d\phi_i' \quad (7)$$

We choose to estimate L and the parameters of h (i.e. the parameters of the BRDF β) by running the following alternating minimization scheme employed in [*P. Favaro and S. Soatto. Shape and reflectance estimation from the information divergence of blurred images. In European Conference on Computer Vision, pages 755-768, June* 2000], which is provably minimising the chosen Φ while preserving the non-negativity of L. The scheme consists of the following iterations:

1. Fix the parameters of the BRDF and recover L by using the Lucy-Richardson iteration (see citation above)
2. Fix the light distribution L and recover the parameters of the BRDF in h by gradient descent.

Figure 10:
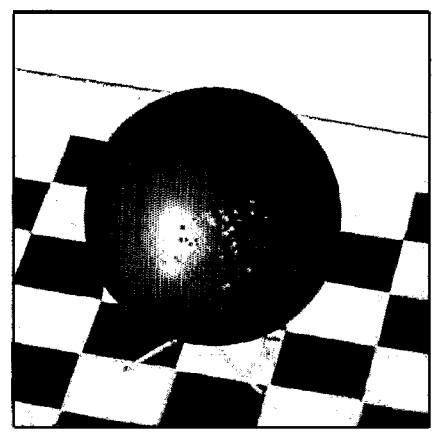
FIG. 10 shows an example of general light distribution recovery using frontier points.
Figure 10:
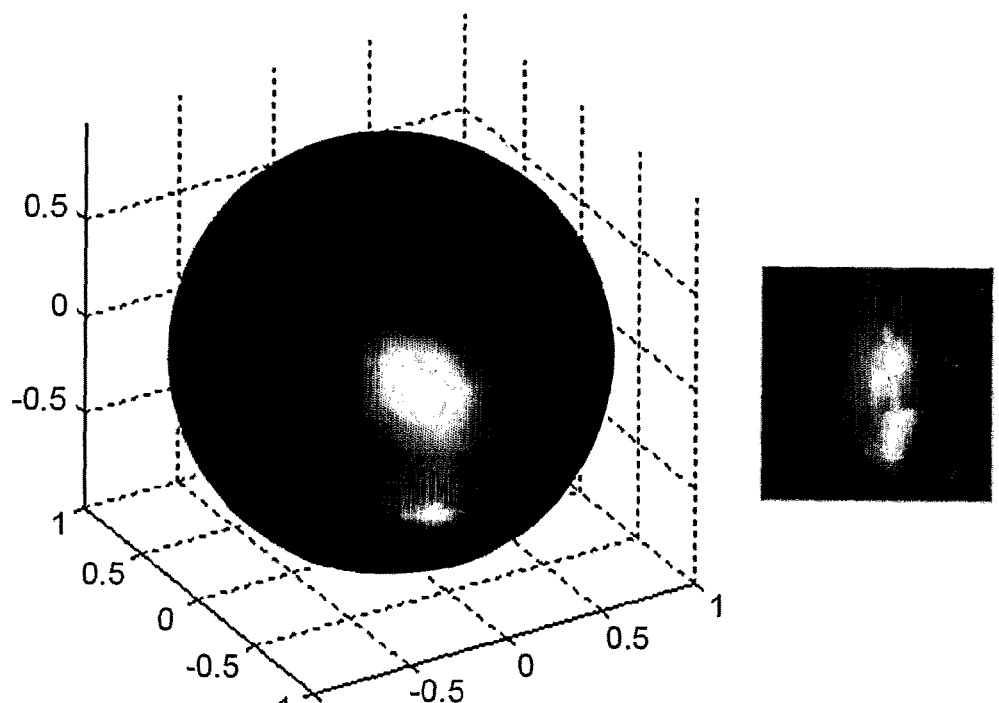
Figure 10:

An example of recovering a complex illumination environment using the technique described in this section is given in FIG. 10.

FIG. 10 shows general light distribution recovery with frontier points. (a) A plastic sphere with 80 frontier points defined on it. (b) Left: the recovered light field for the scene mapped onto a sphere. Right: a view of the light source (two bright spots)—note how the two light distribution peaks are preserved in the estimated field. (c) Two close-up views of the specularity on the sphere. For each view, the specularity in the real image is followed by a synthetic rendering of the same view using the estimated light-field and BRDF. The structure of the specularity has been captured correctly.

Case II: Varying Illumination (M>1 and K=1)

Here we assume that K=1 and M>1. This typically arises in photometric stereo where the camera vantage point is kept fixed while the lighting changes between image captures. The optimization problem (3) becomes $$\hat{\beta}, \hat{L}_1, \ldots, \hat{L}_m = \arg\min_{\beta, L_1, \ldots, L_m} \sum_{m=1}^{M} \Phi(I_m, J_m) \quad (8)$$

we restrict our representation of the light distribution to a single moving point light source, i.e. we assume that $L(R_{P1}(\theta_i,\phi_i))=\lambda\delta(\theta_L-\theta_1)\delta(\phi_L-\phi_L)$ where δ is the Dirac delta. Then, we immediately obtain that $$J_m = \lambda_m \beta(\theta_L, \phi_L; \theta_m, \phi_m) \cos\theta_L \sin\theta_L \quad (9)$$

Since in this case the nonnegativity of L is automatically guaranteed, we do not need to resort to the Kullback-Leibler pseudo-distance and the corresponding alternating minimization scheme. For simplicity, we choose Φ to be simply the $L_2$ norm of the difference of the measured intensities and the ones predicted by the model (9), i.e.

$$\Phi(I_m, J_m) \doteq (I_m - J_m)^2$$

To solve problem (8) we run a gradient descent or a standard nonlinear optimisation method, as the space of the unknowns is very small (in practice, 4 parameters for the BRDF β and 3M parameters for the illumination). As an example of a nonlinear optimisation method we mention the implementation of lsqnonlin in Matlab®. An example of the technique described in this section is given in FIG. 11.

Figure 11:
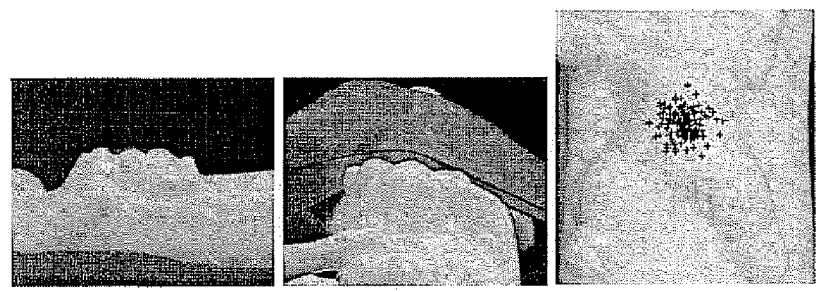
FIG. 11 shows an example of reconstruction of a porcelain figurine using frontier points.
Figure 11:
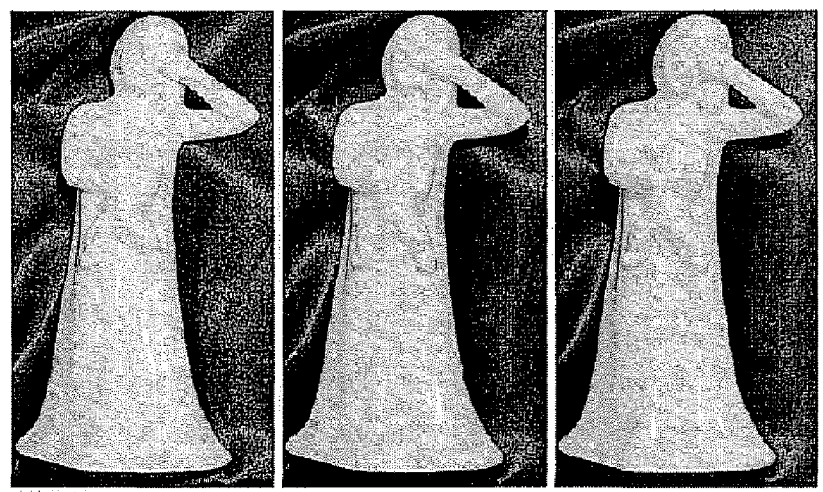
Figure 11:
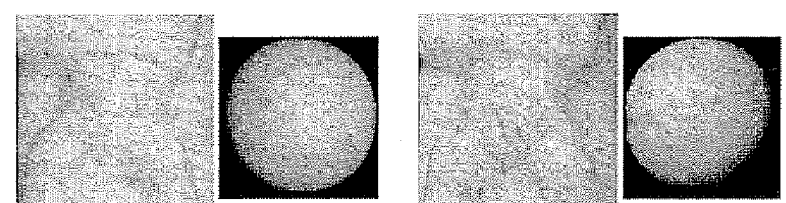
Figure 11:
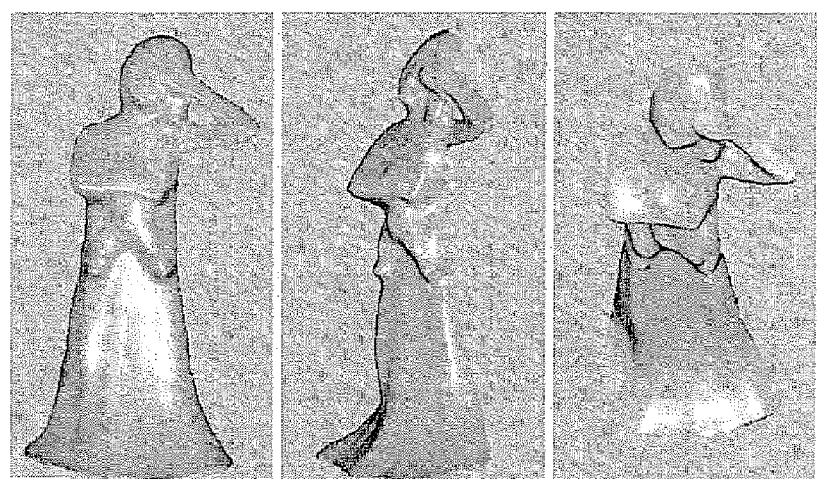

FIG. 11 shows an example of reconstruction of porcelain figurine using frontier points. (a) Left to right: Images of the figurine with contours extracted. The frontier points defined on a small convex region of the figurine. (b) Three input images with varying light source (c) Two pairs of images of the real figurine next to a synthetically rendered example sphere of the same material under the same illumination. To synthetically render the example sphere, the estimated illumination and BRDF parameters have been used. (d) Three images from front, side and top of the 3-d reconstruction of the porcelain object.

FIGS. 1 to 5 and 8 show flow diagrams for implementing embodiments of the invention.

Referring to FIG. 1, this shows a flow diagram of a procedure for capturing images and determining a set of frontier points. The steps in FIG. 1 are as follows:

Step 1—Capture a set of images, of the object from a plurality of different directions (using any appropriate lighting).
Step 2—Use 2 cameras & capture e.g. 10 images with each, for each image recording the camera positions.
Step 3—Generate silhouette for each image and generate e.g. 100 image pairs, a pair=one from each camera.
Step 4—Compute e.g. 100 frontier points. Frontier point: X, Y, Z+normal direction (Phi, Theta)

Figure 2:
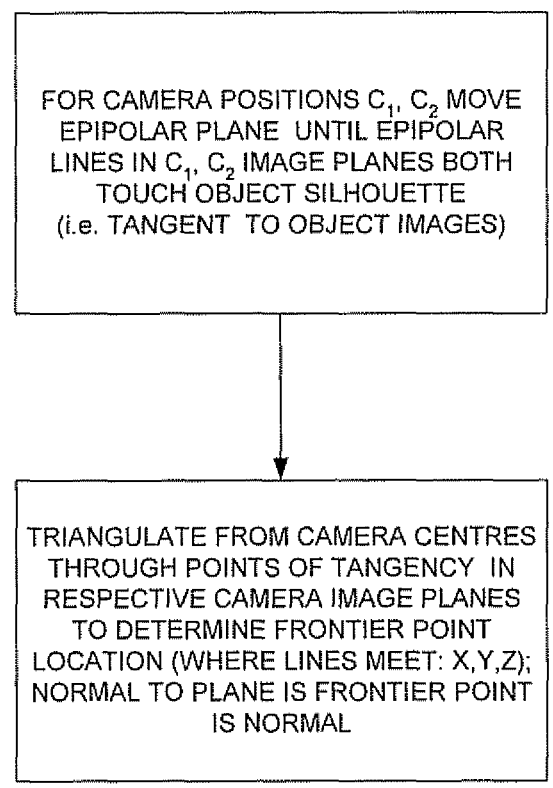
FIG. 2 shows a procedure for determining a frontier point location.

Referring to FIG. 2, this shows a procedure for determining a frontier point location. The steps in FIG. 2 are as follows:

Step 1—For camera positions c1, c2 move epipolar plane until epipolar lines in c1, c2 image planes both touch object silhouette (i.e. tangent to object images).
Step 2—Triangulate from camera centres through points of tangency in respective camera image planes to determine frontier point location (where lines meet: x,y,z); normal to plane is frontier point is normal.

Figure 3:
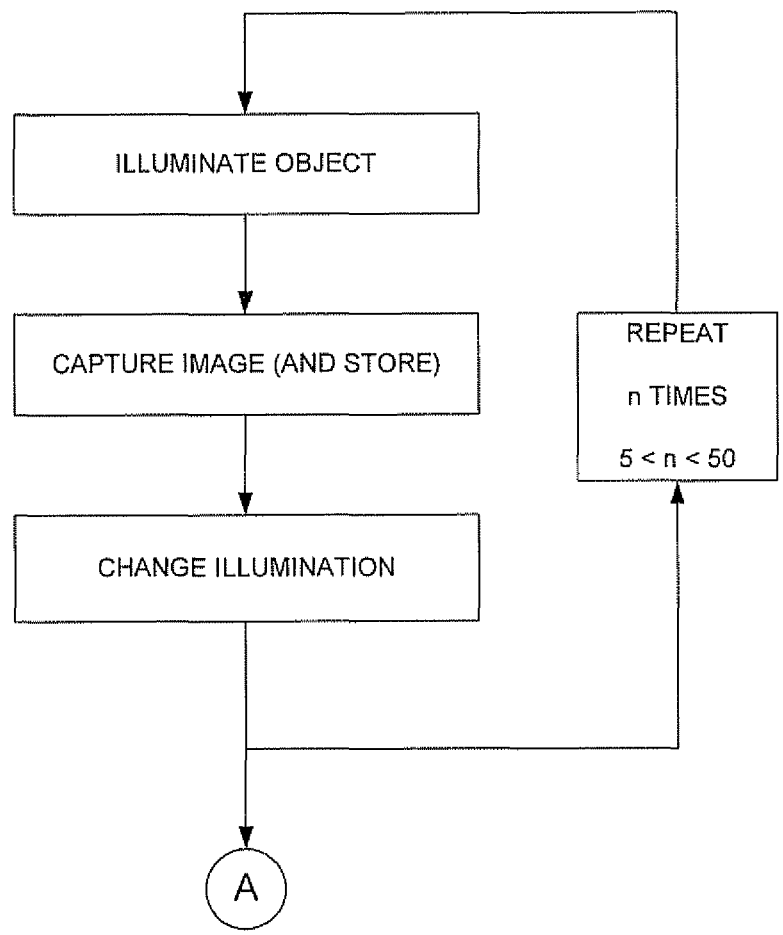
FIG. 3 shows a flow diagram of a procedure for capturing images for processing.

Referring to FIG. 3, this shows a procedure to determine, for a data set a set of images (e.g. from a standard digital camera), each with a lighting direction and intensity ("Intensity Images") and a set of frontier points with associated intensities, and for this object, a set of reflectance parameters, and in the set of images:
1) Viewpoint of image capture camera same (i.e. viewpoint constant)
2) Lighting varies
Step 1—Illuminate object
Step 2—Capture image (and store)
Step 3—Change illumination
Step 4—Repeat n times 5≦n≦50

Figure 4:
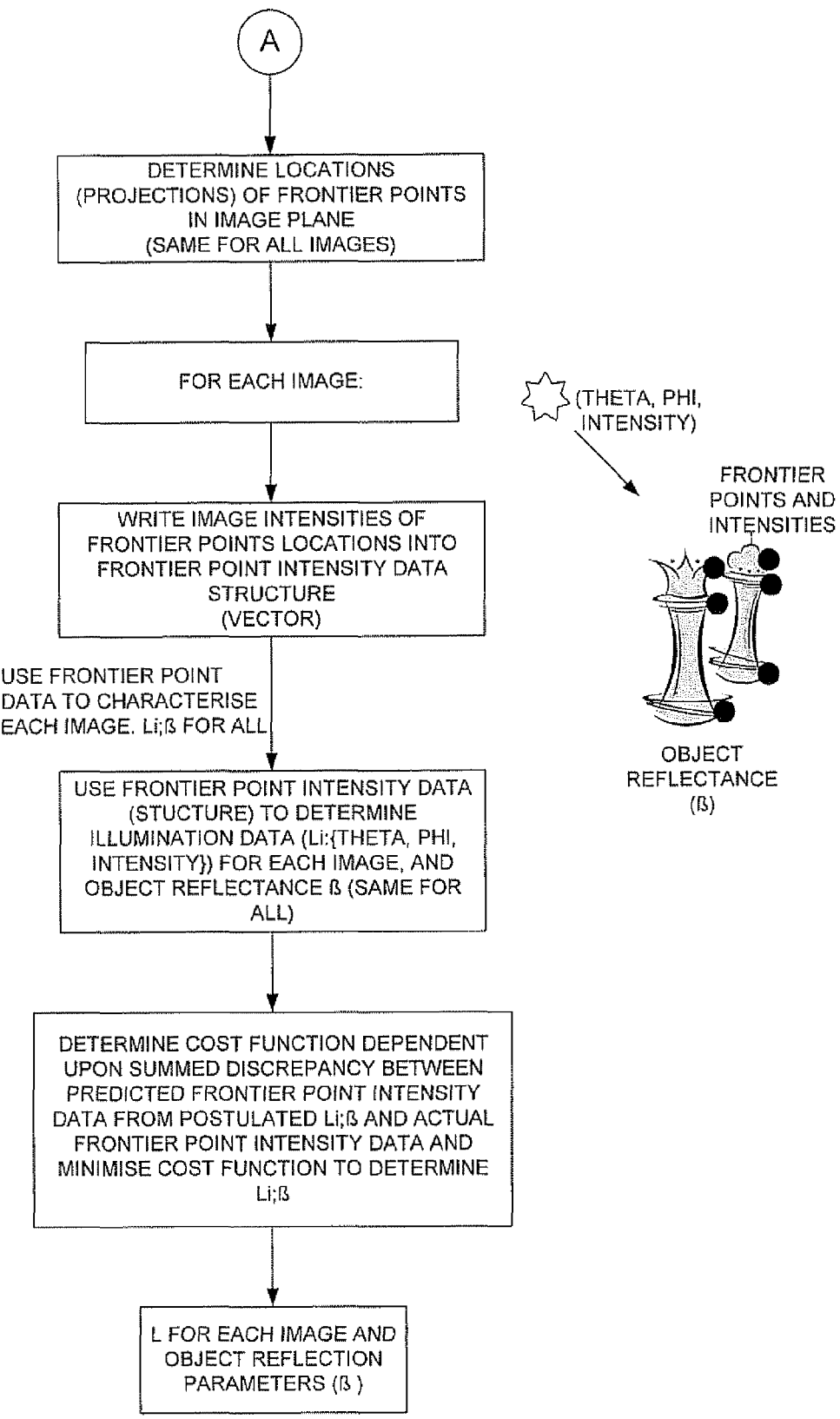
FIG. 4 shows a flow diagram of a procedure for determining lighting and object reflection parameters from the images captured by the procedure of FIG. 3.

Referring to FIG. 4 this shows flow diagram of a procedure for determining lighting and object reflection parameters from the images captured by the procedure of FIG. 3.
The steps are as follows:
Step 1—Determine locations (projections) of frontier points in image plane (same for all images).
Step 2—For each image
Step 3—Write image intensities of frontier points locations into frontier point intensity data structure (vector)
Step 4—Use frontier point data to characterise each image: $L_i;\beta$ for all
Step 5—Use frontier point intensity data (structure) to determine illumination data ($L_i$:{theta, phi, intensity}) for each image, and object reflectance β (same for all)
Step 6—Determine cost function dependent upon summed discrepancy between predicted frontier point intensity data from postulated $L_i;\beta$ and actual frontier point intensity data and minimise cost function to determine $L_i;\beta$
Step 7—L for each image and object reflection parameters (β)

Figure 5:
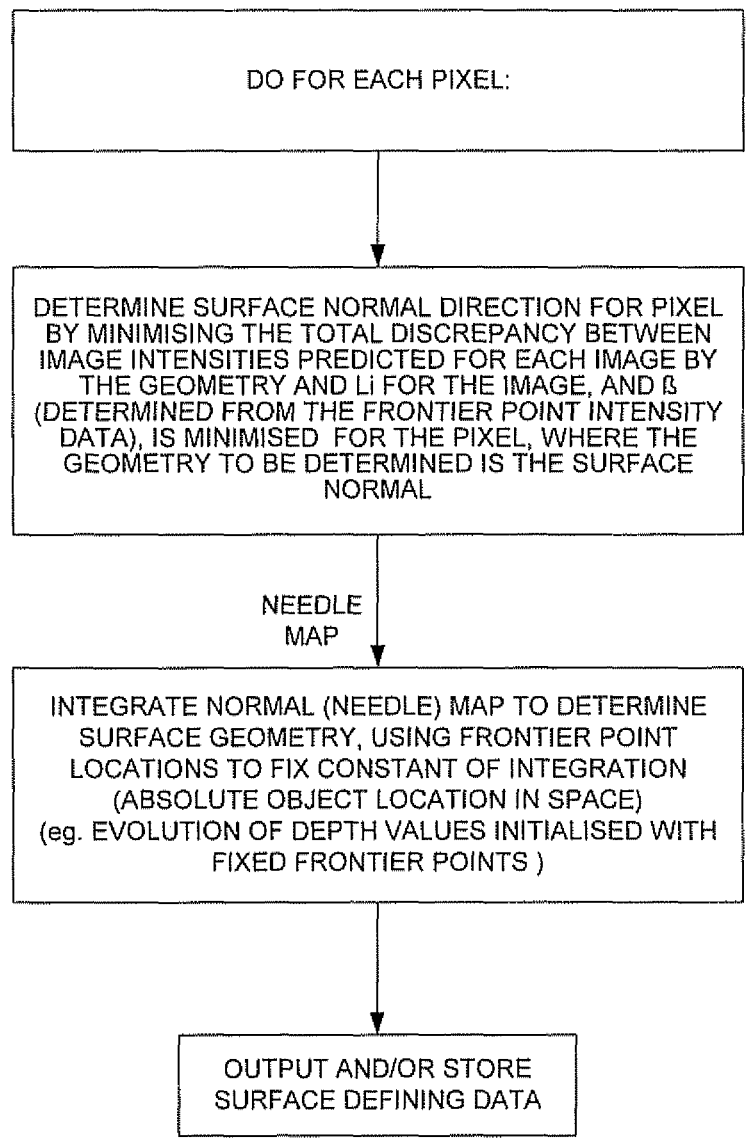
FIG. 5 shows a procedure for determining an object geometry from the data provided by the procedure of FIG. 4.

FIG. 5 shows a procedure for determining an object geometry from the data provided by the procedure of FIG. 4; determine object geometry for which the total discrepancy between image intensities predicted for each image by the geometry and $L_i$ for the image, and β (determined from the frontier point intensity data), is minimised ("photometric stereo")

Figure 6:
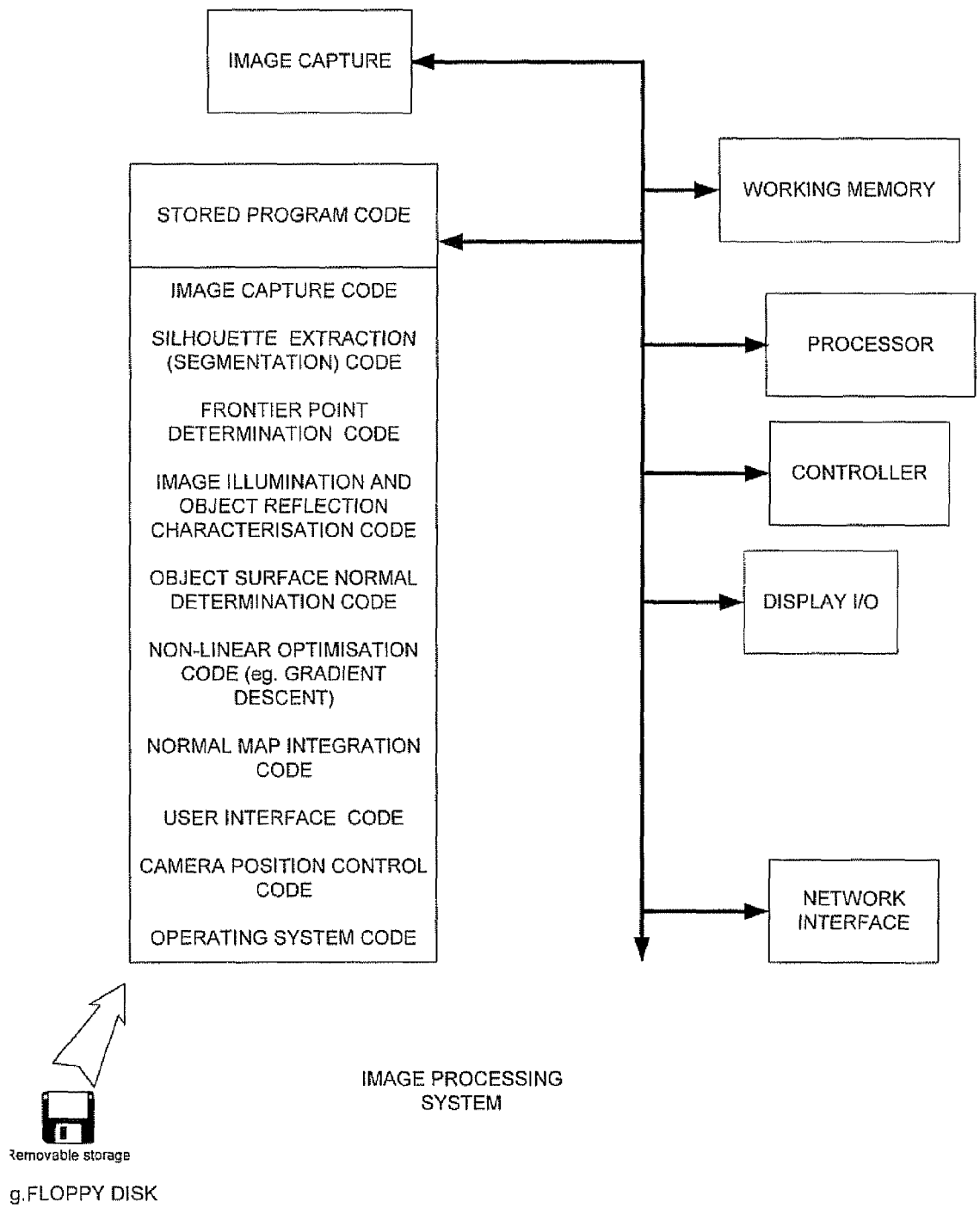
FIG. 6 shows a block diagram of an image processing system embodying an aspect of the present invention.

The steps are as follows:
Step 1—Do for each pixel:
Step 2—Determine surface normal direction for pixel by minimising the total discrepancy between image intensities predicted for each image by the geometry and $L_i$ for the image, and β (determined from the frontier point intensity data), is minimised for the pixel, where the geometry to be determined is the surface normal (to provide a needle map)
Step 3—Integrate normal (needle) map to determine surface geometry, using frontier point locations to fix constant of integration (absolute object location in space) (e.g. evolution of depth values initialised with fixed frontier points)
Step 4—Output and/or store surface defining data FIG. 6 shows a block diagram of an image processing system embodying an aspect of the present invention. The system includes stored program code, optionally provided on a removable storage medium illustratively shown by a floppy disk, the code comprising: image capture code; silhouette extraction (segmentation) code; frontier point determination code; image illumination and object reflection characterisation code; object surface normal determination code; nonlinear optimisation code (e.g. gradient descent); normal map integration code; user interface code; camera position control code; and operating system code.

Figure 7:
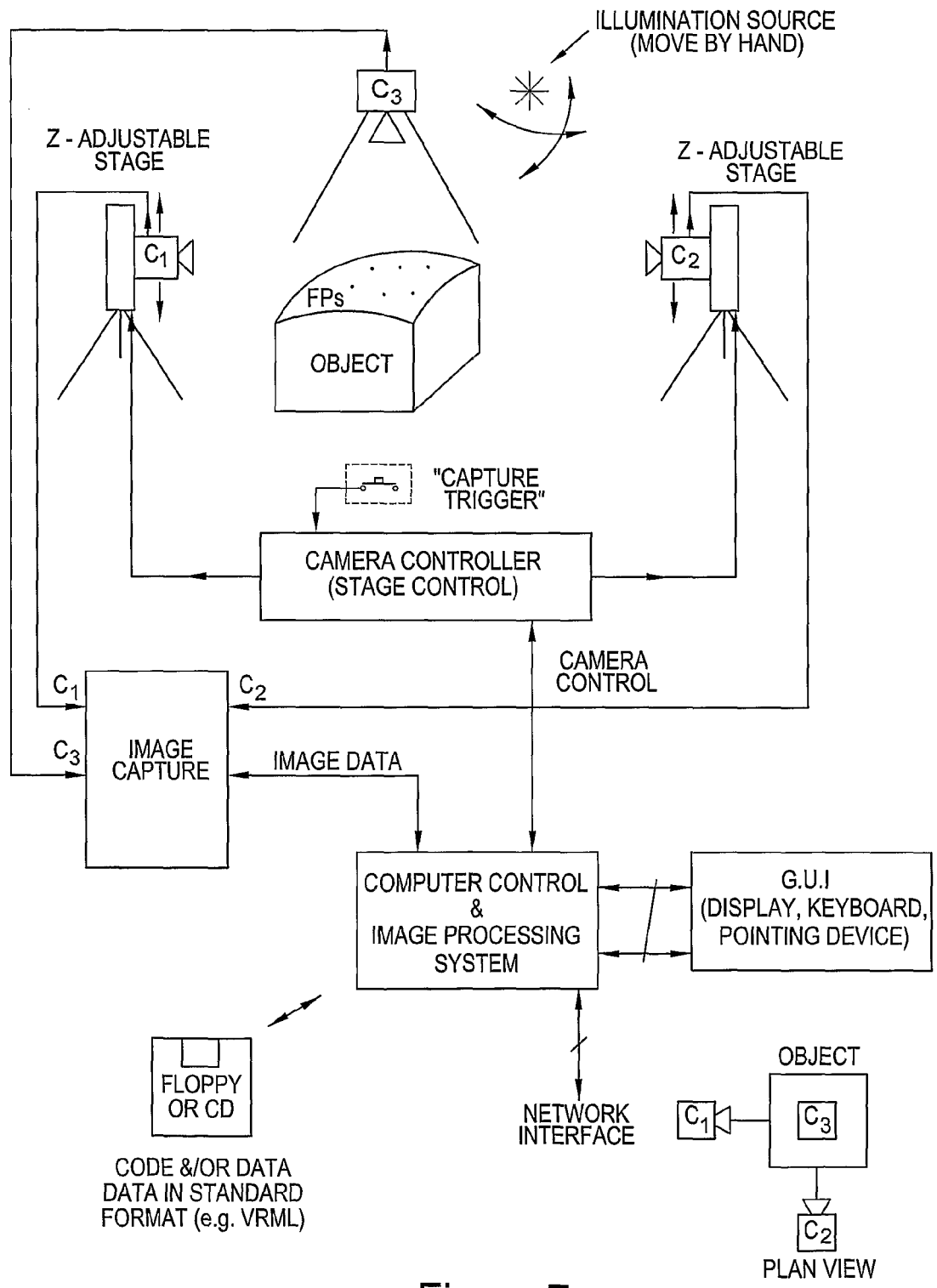
FIG. 7 shows a block diagram of an image capture and processing system embodying an aspect of the present invention.

FIG. 7 shows a block diagram of an image captured processing system embodying an aspect of the present invention.

Figure 8:
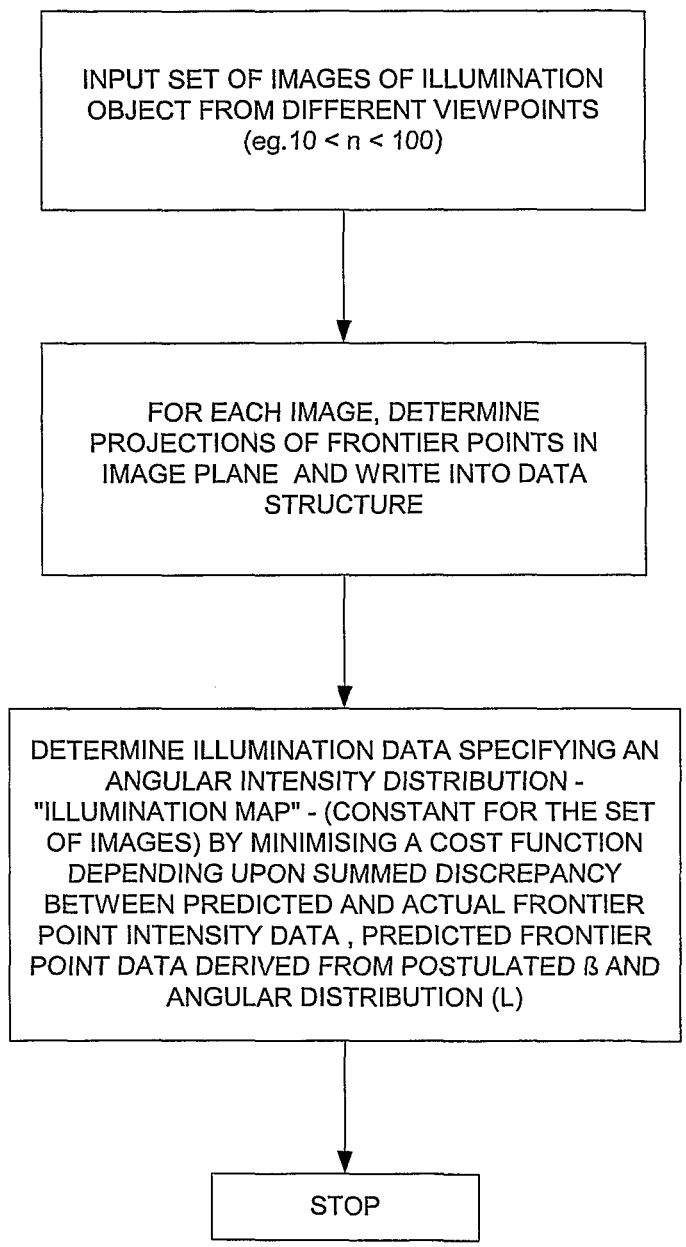
FIG. 8 shows a flow diagram of a procedure for determining illumination data from a set of images.

FIG. 8 shows a flow diagram for implementing a fixed illumination variant procedure (Case I as above). The steps are as follows:

Step 1—Input set of images of illumination object from different viewpoints (e.g. 10<n<100)
Step 2—For each image, determine projections of frontier points in image plane and write into data structure
Step 3—Determine illumination data specifying an angular intensity distribution—"illumination map"—(constant for the set of images) by minimising a cost function depending upon summed discrepancy between predicted and actual frontier point intensity data, predicted frontier point data derived from postulated B and angular distribution (L).

Figure 12:
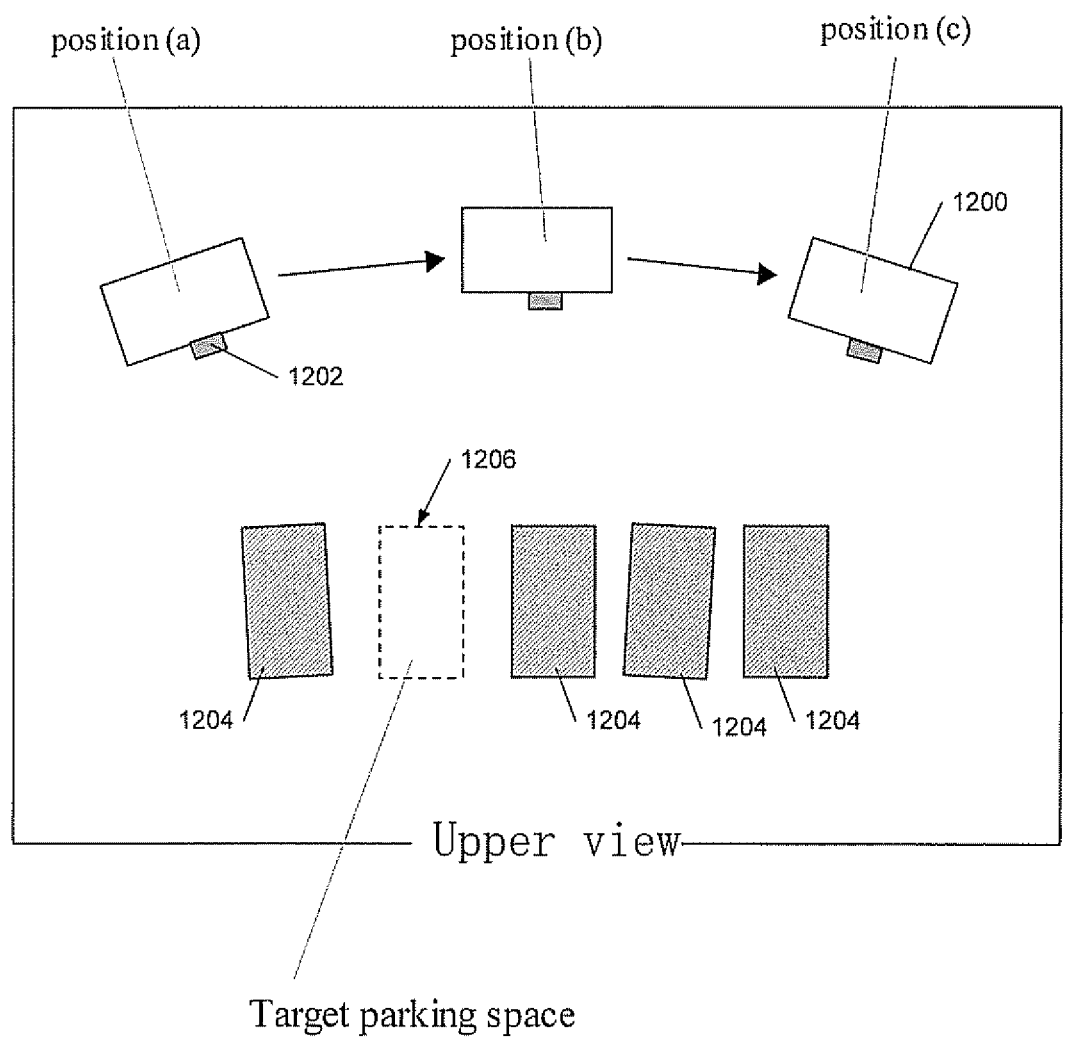
FIG. 12 shows an automatic parking system using an embodiment of the invention.

Referring to FIG. 12, this shows an automatic parking system, which uses an embodiment of the above-described system.

It will be recalled that, broadly speaking, embodiments of the technique described here enable the construction of a three-dimensional representation of an object by first determining frontier point data, and then characterising a set of images to determine an object reflectance and, for each image of the set, illumination data, this information then being used to determine geometry of a surface of the imaged object. To determine the frontier point data, images captured from two different positions are silhouetted and processed to determine frontier points on the object and then preferably further images are captured looking generally towards the frontier points on the object.

In the system of FIG. 12, one or more cameras (1202) is positioned on a movable vehicle (1200) to capture images for determining frontier points and also for use in determining object surface geometry. The vehicle is equipped with a system which allows a determination of the relative position of the vehicle from a starting point (for the processing), in FIG. 12(a). This system may comprise, for example, a steering angle meter and an odometer, or, alternatively, other equipment such as a gyroscopic position determination system. This allows images to be captured at a number of different positions (positions (a), (b), (c) in FIG. 12), the locations of these positions being known at least relative to one another, for use in the above-described techniques.

Preferably the vehicle also is equipped with a system such as GPS (Global Positioning System) for measuring latitude and longitude and for providing a clock for determining date and time. This enables a direction of sunlight to be determined, which facilitates implementation of the above techniques. More particularly, although we have described techniques in which the illumination is an unknown, and varied in order to determine object reflectance, where the illumination direction is known then object reflectance may be determined without the need for varying the illumination. However, alternatively, this system may be omitted or not used and natural variations in the lighting conditions employed.

The automatic parking system is thus able to capture images at known positions (because the vehicle with the camera can move around and capture images and can also determine its relative position at any point), and with this information, and optionally the direction of sunlight, can reconstruct the shape of surrounding objects, in particular vehicles (1204) parked nearby. Knowing the shape of these vehicles enables the shape of a target parking space (1206) to be determined and then a conventional automatic steering/parking system can be used to park the vehicle into the space.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A computer-implemented of determining data characterising a set of images of an object, the method being implemented in a computer comprising processor and a memory in communication with the processor, the method comprising:
   inputting, to the processor, data from a first set of images of said object captured from a plurality of different positions;
   determining, by the processor, frontier point data from said data for said first set of images and data defining said image capture positions, said frontier point data defining a plurality of frontier points on said object, and for each said frontier point, a direction of a normal to the surface of the object at the frontier point;
   inputting, to the processor, data from a second set of captured images of said object, said second set of images having substantially the same viewpoint and different illumination conditions; and
      determining, by the processor, data characterising said second set of images using said data for said second set of images and said frontier point data, said image set characterising data comprising object reflectance parameter data ($\beta$) and, for each image of said second set, illumination data (L) comprising data defining an illumination direction and illumination intensity for the image;
   wherein said determining of frontier point data uses pair of images of said first set of images, the two images of said pair being captured by first and second respective cameras; and
   wherein each frontier point is a point in three-dimensions on the surface of the object wherein the plane defined by the frontier point and centres of said first and second cameras viewing the frontier point is tangent to the object.

2. A method as claimed in claim 1 further comprising generating, by the processor, a plurality of said pairs of images by pairing an image captured by said first camera at a first position with a plurality of images captured by said second camera at a plurality of different second positions.

3. A method as claimed in claim 1 wherein said frontier point determining comprises determining, by the processor, silhouette data for each image of said first set of images; and determining, by the processor, said frontier point data using said silhouette data.

4. A method as claimed in claim 1 wherein said determining of image set characterising data further comprises determining, by the processor, projected positions of said frontier points defined by said frontier point data into an image of said second set of images, determining, by the processor, image intensity data at each of said projected positions, and determining, by the processor, said image set characterising data responsive to said projected positions and said image intensity data at said projected positions.

5. A method as claimed in claim 1 wherein said determining of image set characterising data further comprises:
   determining, by the processor, postulated image set characterising data comprising postulated object reflectance parameter data and postulated illumination data for said images of said second set of images;
   determining, by the processor, predicted second set of image data from said postulated image set characterising data and said frontier data, said predicted second set image data defining for said images of said second set of images, predicted image values at projections of said frontier points onto said images of said second set of images; and
   minimising, by the processor, a cost function dependent upon a summed discrepancy between said predicted second set image data and said data for said second set of images.

6. A method as claimed in claim 1 further comprising determining, by the processor, geometry data defining a geometry of said object surface using said image set characterising data.

7. A method as claimed in claim 6 wherein said geometry data determining comprises determining, by the processor, said geometry data by a photometric stereo geometry determining procedure.

8. A method as claimed in claim 6 wherein a pixel of an image of said second set of images has a substantially spatially corresponding counterpart in each other image of said second set of images, and wherein said geometry data determining comprises determining, by the processor, for a set of corresponding pixels, a best fit of a surface normal to the object given pixel values of said set of pixels and said image set characterising data.

9. A method of determining data characterising a set of images of an object, the method comprising:
   inputting, by the processor, data from a first set of images of said object captured from a plurality of different positions;
   determining, by the processor, frontier point data from said data for said first set of images and data defining said image capture positions, said frontier point data defining a plurality of frontier points on said object, and for each said frontier point, a direction of a normal to the surface of the object at the frontier point;

inputting, to the processor, data from a second set of captured images of said object, said second set of images having different viewpoints and illumination conditions; and determining, by the processor, data characterising said second set of images using said data for said second set of images and said frontier point data, said image set characterising data comprising object reflectance parameter data ($\beta$) and illumination data comprising data defining a common angular illumination intensity distribution for all the images of said second set of images;

wherein said determining of frontier point data uses pair of images of said first set of images, the two images of a said pair being captured by first and second respective cameras; and wherein each frontier point is a point in three-dimensions on the surface of the object where the plane defined by the frontier point and centres of said first and second cameras viewing the frontier point is tangent to the object.

10. A method of assisting parking using the method of claim 1.

11. A non-transitory computer readable medium carrying processor control code to, when running, implement the method of claim 1.

12. A system for determining data characterising a set of images of an object, the system comprising:

an input to input data from a first set of images of said object captured from a plurality of different positions, and data from second set of captured images of said object, said second set of images having substantially the same viewpoint and different illumination conditions;

data memory for storing data to be processed;

program memory storing processor control code; and a processor coupled to said input, data memory and program memory to load and implement said stored code, said code comprising code for controlling the processor to:

determine frontier point data from said data for said first set of images and data defining said image capture positions, said frontier point data defining a plurality of frontier points on said object and for each said frontier point, a direction of a normal to the surface of the object at the frontier point; and determine data characterising said second set of images using said data for said second set of images and said frontier point data, said image set characterising data comprising object reflectance parameter data ($\beta$) and, for each image of said second set, illumination data (L) comprising data defining an illumination direction and illumination intensity for the image;

wherein said determining of frontier point data uses pairs of images of said first set of images, the two images of a said pair being captured by first and second respective cameras; and wherein each frontier point is a point in three-dimensions on the surface of the object where the plane defined by the frontier point and centres of said first and second cameras viewing the frontier is tangent to the object.

13. A system as claimed in claim 12 wherein said code further comprises code to determine geometry data defining a geometry of said object surface using said image set characterising data.

14. A system as claimed in claim 12 further comprising at least one camera controller for controlling a position of a camera to capture an image for said first set of images, and an image capture system for capturing images for said first and second sets of images, and wherein said code further comprises code to control said camera controller and capture images for said first and second sets of images.

15. A parking assistance system including the system of claim 12.

16. A computer-implemented method of determining data characterising a set of images of an object, the method being implemented in a computer comprising processor and a memory in communication with the processor, the method comprising:

inputting, to the processor, data from a first set of images of said object captured from a plurality of different positions by at least a first camera and a second camera;

determining, by the processor, frontier point data from said data for said first set of images and data defining said image capture position, said frontier point data defining a plurality of frontier points on said object, and for each said frontier point, a direction of a normal to the surface of the object at the frontier point, wherein each frontier point is a point in three-dimensions on the surface of the object where the plane defined by the frontier point and centres of said first and second cameras viewing the frontier point is tangent to the object;

inputting, to the processor, data from a second set of captured images of said object, said second set of images having substantially the same viewpoint and different illumination conditions; and determining, by the processor, data characterising said second set of images using said data for said second set of images and said frontier point data, said image set characterising data comprising object reflectance parameter data ($\beta$) and, for each image of said second set, illumination data (L) comprising data defining an illumination direction and illumination intensity for the image.

* * * * *

UNITED STATES PATENT AND TRADEMARK OFFICE
CERTIFICATE OF CORRECTION

PATENT NO. : 8,417,021 B2
APPLICATION NO. : 12/089140
DATED : April 9, 2013
INVENTOR(S) : Cipolla et al.

It is certified that error appears in the above-identified patent and that said Letters Patent is hereby corrected as shown below:

In the Claims:

In Column 13, line 39, after "implemented" insert --method--.

Signed and Sealed this
Twenty-sixth Day of November, 2013

Margaret A. Focarino
*Commissioner for Patents of the United States Patent and Trademark Office*